(12) United States Patent
Nagano

(10) Patent No.: US 7,104,908 B2
(45) Date of Patent: Sep. 12, 2006

(54) REAR DERAILLEUR

(75) Inventor: Masashi Nagano, Izumi (JP)

(73) Assignee: Shimano Inc., Osaka (JP)

( * ) Notice: Subject to any disclaimer, the term of this patent is extended or adjusted under 35 U.S.C. 154(b) by 371 days.

(21) Appl. No.: 10/721,284

(22) Filed: Nov. 26, 2003

(65) Prior Publication Data

US 2004/0106482 A1 Jun. 3, 2004

(30) Foreign Application Priority Data

Feb. 12, 2002 (JP) .............................. 2002-350251

(51) Int. Cl.
*F16H 9/06* (2006.01)
(52) U.S. Cl. .................................................... 474/82
(58) Field of Classification Search ................. 474/78, 474/80, 81, 82, 83
See application file for complete search history.

(56) References Cited

U.S. PATENT DOCUMENTS

| | | | | | |
|---|---|---|---|---|---|
| 3,008,343 | A | * | 11/1961 | Wasley ....................... | 74/502.6 |
| 3,677,103 | A | * | 7/1972 | Huret et al. ................... | 474/82 |
| 3,702,080 | A | | 11/1972 | Huret et al. | |
| 4,226,131 | A | | 10/1980 | Yamasaki | |
| 4,637,808 | A | * | 1/1987 | Nakamura ................... | 474/80 |
| 5,857,932 | A | * | 1/1999 | Sugimoto .................... | 474/82 |
| RE36,830 | E | * | 8/2000 | Lumpkin ..................... | 474/79 |
| 6,287,228 | B1 | * | 9/2001 | Ichida .......................... | 474/82 |
| 6,793,598 | B1 | * | 9/2004 | Savard ......................... | 474/82 |

2004/0106482 A1 6/2004 Nagano

FOREIGN PATENT DOCUMENTS

| | | |
|---|---|---|
| JP | 46-1921 | 10/1971 |
| JP | 50-47153 | 5/1975 |
| JP | 54-9853 | 1/1979 |
| JP | 54-47247 | 4/1979 |
| JP | 54-47248 | 4/1979 |
| JP | 54-72831 | 6/1979 |
| JP | 55-29695 | 3/1980 |
| JP | 55-127272 | 10/1980 |
| JP | 55-140678 | 11/1980 |
| JP | 55-148676 | 11/1980 |
| JP | 62-99291 | 5/1987 |
| JP | WO 96/24787 | 8/1996 |
| JP | 2000-247284 | 9/2000 |

* cited by examiner

*Primary Examiner*—Vicky A. Johnson
(74) *Attorney, Agent, or Firm*—Global IP Counselors, LLP

(57) ABSTRACT

A rear bicycle derailleur includes a base member, a movable member, a guide arm and a tension arm. The base member is adapted to be mounted to a bicycle frame. The movable member is movably coupled to the base member, preferably via a linkage, to move between a retracted position and an extended position. The guide arm is pivotally coupled to the movable member around a first axis and has a guide sprocket. The tension arm is pivotally coupled to the movable member around a second axis and has a tension sprocket. Preferably, the guide arm is freely pivotal about the first axis without being rotationally biased, while the tension arm is rotationally biased by a biasing member about the second axis. Preferably, the guide arm and the tension arm are configured and arranged to move independently of each other.

24 Claims, 13 Drawing Sheets

REAR DERAILLEUR

CROSS-REFERENCE TO RELATED APPLICATIONS

This application claims priority under 35 U.S.C. § 119 to Japanese Patent Application No. 2002-350251. The entire disclosure of Japanese Patent Application No. 2002-350251 is hereby incorporated herein by reference.

BACKGROUND OF THE INVENTION

1. Field of the Invention

The present invention relates to a rear bicycle derailleur to be used as a rear exterior chain shifting device (derailleur) of a bicycle.

2. Description of the Related Art

As the exterior chain shifting device (derailleur) for a bicycle, a rear bicycle derailleur is used. The rear derailleur is a device for speed-changing the bicycle by shifting a chain which is looped over one of a plurality of sprockets or chain wheels arranged concentrically adjacent another sprocket or chain wheel. An example of the derailleur which has been mainly used for the bicycle currently has been disclosed in a number of patent literatures such as WO96/24787 and Japanese Patent Laid-Open No. 2000-247284.

Such a derailleur, particularly the rear derailleur is provided with a tension arm, a freely-pivotable base portion biased in one direction of rotation, and which is biased in the opposite direction by a parallel rocking member or movable member through a pantograph mechanism (i.e., a parallel link mechanism). Two sprocket wheels or pulleys are rotatably supported by this tension arm. A chain is looped over these two sprocket wheels (guide sprocket wheel and tension sprocket wheel) and the chain wheel. A guide sprocket wheel side closer to the above-described chain wheel is moved toward the front of any one of the above-described plurality of chain wheels or sprockets (at this time, the tension sprocket also moves together with guide sprocket) by the above-described pantograph mechanism (i.e., parallel link mechanism), thereby shifting the chain.

Sag or slack of the chain caused by the replacement (shift) is absorbed by combination of two pivot movement in which the pantograph mechanism and the parallel rocking member (movable member) simultaneously pivot and the tension arm provided at a tip end of the movable member also pivots. For this reason, the operation is complicated and this traditional design has suffered from some problems in terms of balance, durability and the like.

Also, parts of bicycles have been standardized. A user typically selects any appropriate wheels from among many sizes in accordance with rider size or a site of use for use in the same manner as other parts. At this time, since some rear derailleurs cannot cope with small wheels, wheels of a desired size could not be selected sometimes.

SUMMARY OF THE INVENTION

Conventionally, since the rear derailleur absorbs sag or slack of the chain by combination of two pivot movement as described above, when the chain is looped over a rear chain wheel of major diameter, a tension sprocket wheel provided at the tip end of the tension arm gets relatively close to the ground. Particularly, when a rear derailleur used with multiple rear gears is used in combination with a front derailleur in addition to the rear derailleur, if a front chain wheel of minor diameter and a rear chain wheel of major diameter are selected, it is located at right angles to the ground, and therefore, the tension sprocket wheel gets particularly close to the ground.

When the tension sprocket wheel comes closer to the ground, this tension sprocket wheel or the chain may collide with stones, plants or debris, which adversely affects performance.

With the present invention, a rear derailleur is provided that has structure in which even when the chain has been looped over a rear chain wheel of major diameter, the chain sprocket wheel does not come so close to the ground due to the above-described problems and to thereby improve performance. Also, with the present invention, a rear derailleur is provided that facilitates detachment and attachment of the wheel, i.e., a rear derailleur having a wide application range to wheel size. Furthermore, this rear derailleur simplifies chain replacement operation or shifting during speed variation for improving the durability.

The above-described problems are basically solved by the following means.

Solution means of a first aspect of the present invention is a rear derailleur for a bicycle, comprising: a base member having an installation area for installing to a bicycle body; a parallel rocking member or movable member; a pair of parallel links interposed between the base member and the movable (parallel rocking) member, for constituting an actual parallel link mechanism (linkage assembly) together with those; a guide arm provided so as to be freely rockable around a first rocking axis parallel with a rear wheel axle axis on the movable (parallel rocking) member; a guide sprocket provided so as to be freely rotatable around a first rotation axis parallel with the first rocking axis on the guide arm; a tension arm provided so as to be rockable around a second rocking axis parallel with the rear wheel axle axis on the movable member; a tension sprocket provided so as to be freely rotatable around a second rotation axis parallel with the second rocking axis on the tension arm; and a biasing spring provided between the tension arm and the movable member in order to bias the tension sprocket toward the rear of the bicycle.

Solution means of a second aspect of the present invention is a rear derailleur, wherein a link rocking axis which the parallel link mechanism rocks is orthogonal to the rear wheel axle axis.

Solution means of a third aspect of the present invention is a rear derailleur, wherein the link rocking axis about which the parallel link mechanism rocks is inclined toward the rear wheel axle axis.

Solution means of a fourth aspect of the present invention is a rear derailleur, wherein the first rocking axis is located at a side forward of a bicycle as compared with the second rocking axis.

Solution means of a fifth aspect of the present invention is a rear derailleur, wherein the distance on the tension arm between the second rocking axis and the axis of the tension sprocket is longer than that on the guide arm between the first rocking axis and the axis of the guide sprocket.

Solution means of a sixth aspect of the present invention is a rear derailleur, wherein the installation area has a through hole for passing through a fixing bolt when installing to the bicycle body.

Solution means of a seventh aspect of the present invention is a rear derailleur, wherein a cable pulley over which a control cable is looped is provided rotatably relative to the base member.

Solution means of an eighth aspect of the present invention is a rear derailleur, wherein the cable pulley is provided with a roller bearing for reducing friction due to the rotation.

Solution means of a ninth aspect of the present invention is a rear derailleur, wherein the through hole and the cable pulley are concentric.

Solution means of a tenth aspect of the present invention is a rear derailleur, wherein the above-described through hole and the above-described cable pulley are offset.

Solution means of an eleventh aspect of the present invention is a rear derailleur, wherein the base member can be pivotally installed to the bicycle body through the through hole and this base member is provided with an adjustable stopper in order to limit its pivot position relative to the bicycle body.

Solution means of a twelfth aspect of the present invention is a rear derailleur, wherein the installation area is a bracket member independent of the base member body, and this base member body is pivotally installed to this bracket member.

Solution means of a thirteenth aspect of the present invention is a rear derailleur, wherein the base member is provided with an adjustable stopper in order to limit its pivot position relative to the bracket member.

Solution means of a fourteenth aspect of the present invention is a rear derailleur, wherein one of the parallel links is provided with cable fixing means for fixing a control cable.

Solution means of a fifteenth aspect of the present invention is a rear derailleur, wherein the rear derailleur has been installed to the bicycle body through the installation area and to a rear wheel axle, a plurality of rear chain wheels, the chain of which is replaced, are coaxially fixed by means of this rear derailleur.

Solution means of a sixteenth aspect of the present invention is a bicycle, wherein to a pedal crankshaft which this bicycle has, there are fixed a plurality of front chain wheels coaxial thereto and there is provided a front derailleur for replacing the chain.

Other objects and advantages besides those discussed above shall be apparent to those skilled in the art from the description of preferred embodiments of the invention, which follow. In the description, reference is made to accompanying drawings, which form a part of this disclosure, and which illustrate examples of the present invention. Such examples, however, are not exhaustive of various embodiments of the present invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and together with the description, serve to explain the principles of the invention.

DETAILED DESCRIPTION OF THE PREFERRED EMBODIMENTS

Hereinafter, the description will be made of embodiments according to the present invention.

First Embodiment

Outline Of Bicycle To Which The Present Rear Derailleur Is Installed

Figure 1:
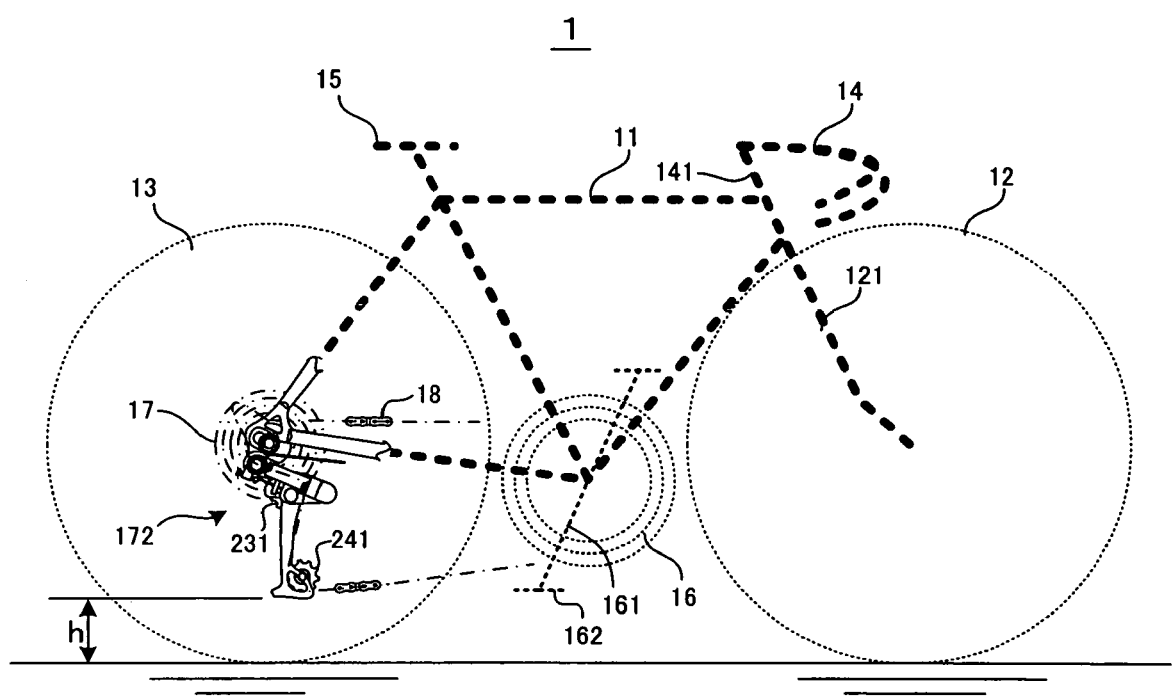
FIG. 1 is a schematic diagram for a bicycle for explaining an embodiment according to the present invention, and a view in common for all embodiments.

FIG. 1 is a schematic diagram of a bicycle 1 for explaining an embodiment according to the present invention, and a figure in common for all embodiments. The bicycle 1 has: a frame 11; a handlebar stem or shaft 141; a fork 121; a front wheel 12; a rear wheel 13; a handlebar 14; a saddle 15; a pair of pedal cranks or crank arms 161; a pair of pedals 162; a set of three front chain rings or wheels 16; a rear cassette with a plurality of rear sprockets or chain wheels 17 and a chain 18.

In the same manner as an ordinary bicycle, the frame 11 is substantially quadrangular; on one apex thereof, there is pivotally supported the handlebar shaft 141; and at a lower end of the handlebar shaft 141, there is provided the fork 121. At a tip end of the fork 121, there is provided the front wheel 12 so as to be freely rotatable. At the upper end of the other end of the handlebar shaft 141, there is fixed the handlebar 14 for handling and steering the bicycle 1.

At another apex of the frame 11, there is provided a crankshaft so as to be rotatable relative to the frame 11, and the plurality of front chain wheels 16 are fixed to the crankshaft concentrically. At both ends of the crankshaft, there are fixed the pair of pedal cranks or crank arms 161, and at the other ends of the pedal cranks 161, there are fixed the pedals 162. Also, at another apex of the frame 11, there is provided the saddle 15.

At the remaining apex of the frame 11, there are coaxially provided the plurality of rear chain wheels 17 through a free wheel (not shown). The rear chain wheels 17 are mounted to the rear wheel axle of the rear wheel for rotation around a rear wheel axis 131. In the neighborhood of this apex, there is provided a rear derailleur 172 in accordance with the present invention, and over a guide sprocket wheel 231, a tension sprocket wheel 241 (to be described later), the rear chain wheel 17 and the front chain wheel 16 used with this rear derailleur 172, there is looped the chain 18.

Structure of Rear Derailleur

Figure 2:
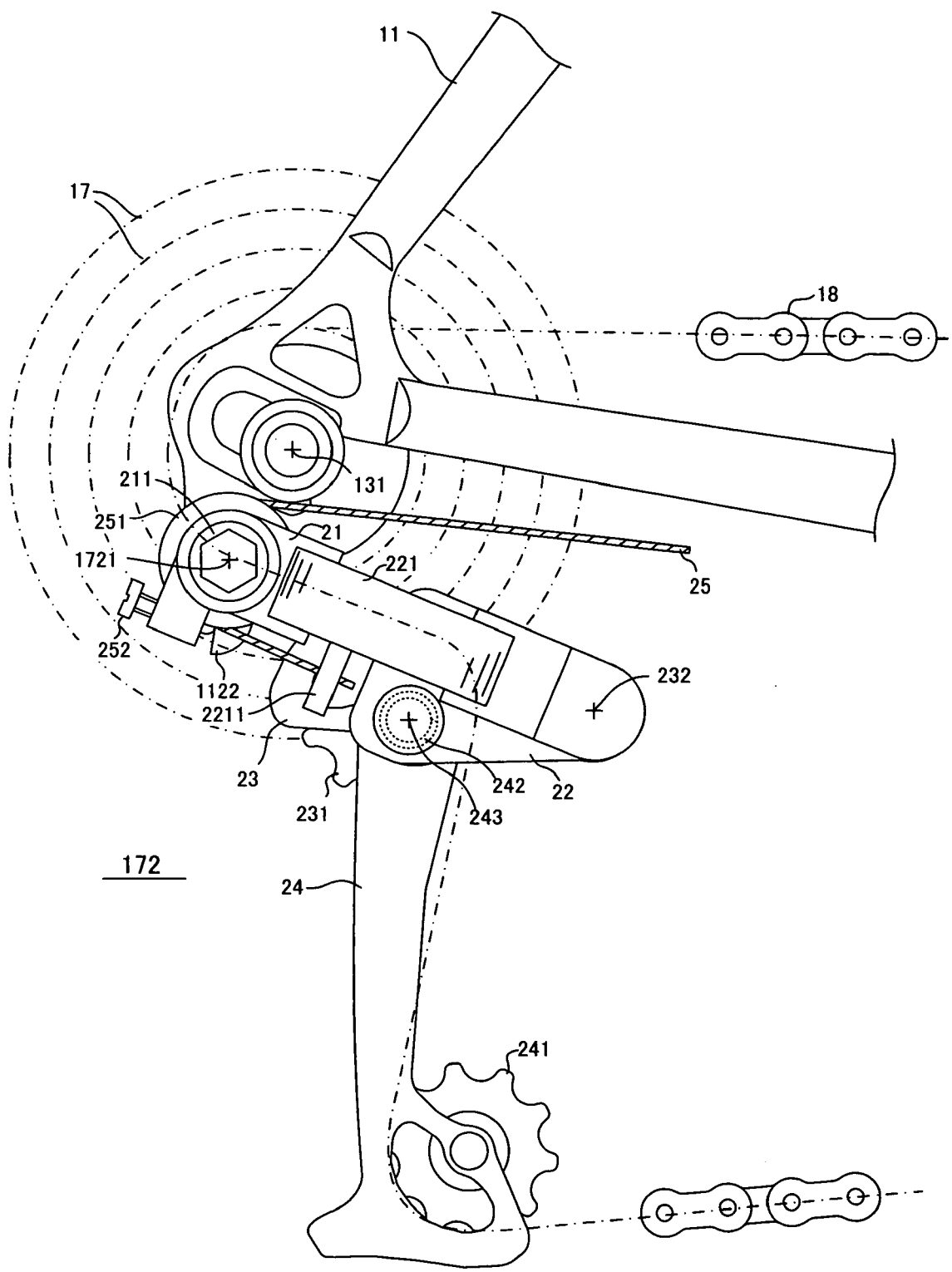
FIG. 2 is an external appearance view when a rear derailleur 172 and a frame 11 according to a first embodiment are viewed from the side.
Figure 3:
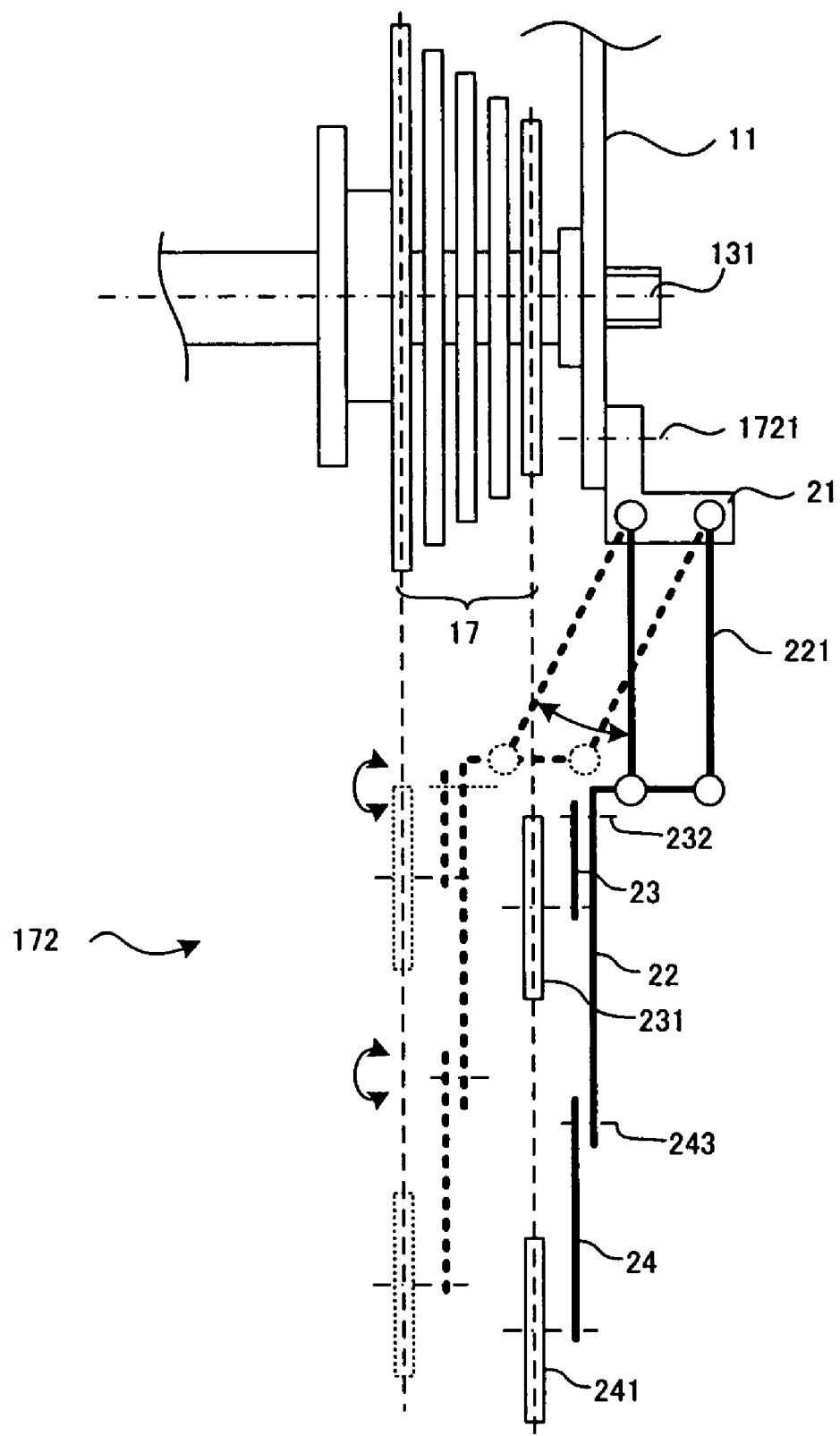
FIG. 3 is a schematic diagram when the rear derailleur 172 and the frame 11 according to the first embodiment are viewed from behind the bicycle.
Figure 4:
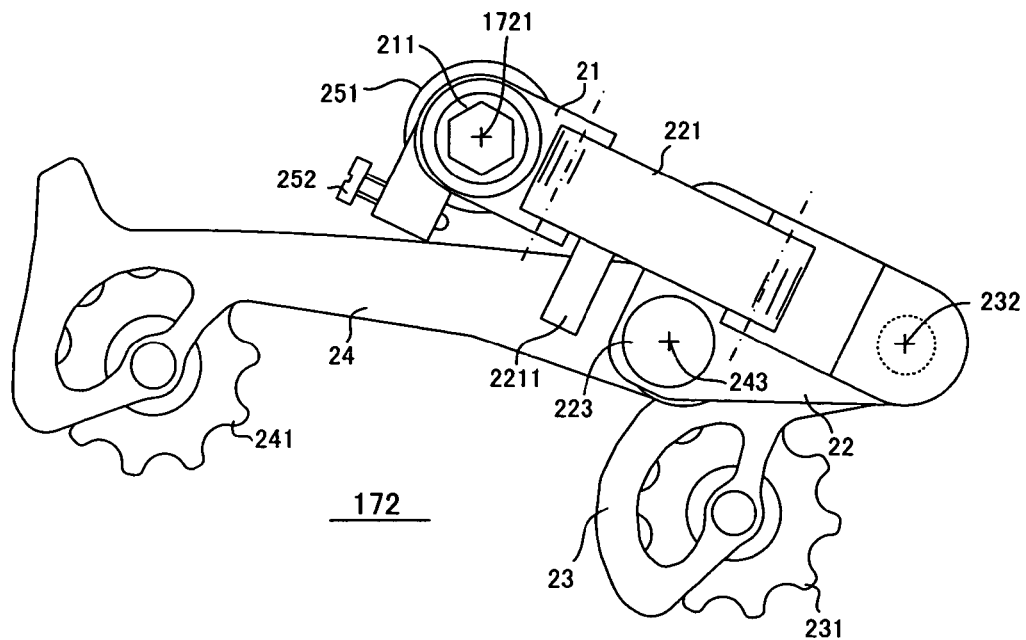
FIG. 4 is an explanatory view showing the rear derailleur 172 alone, removed from the frame 11.
Figure 5:
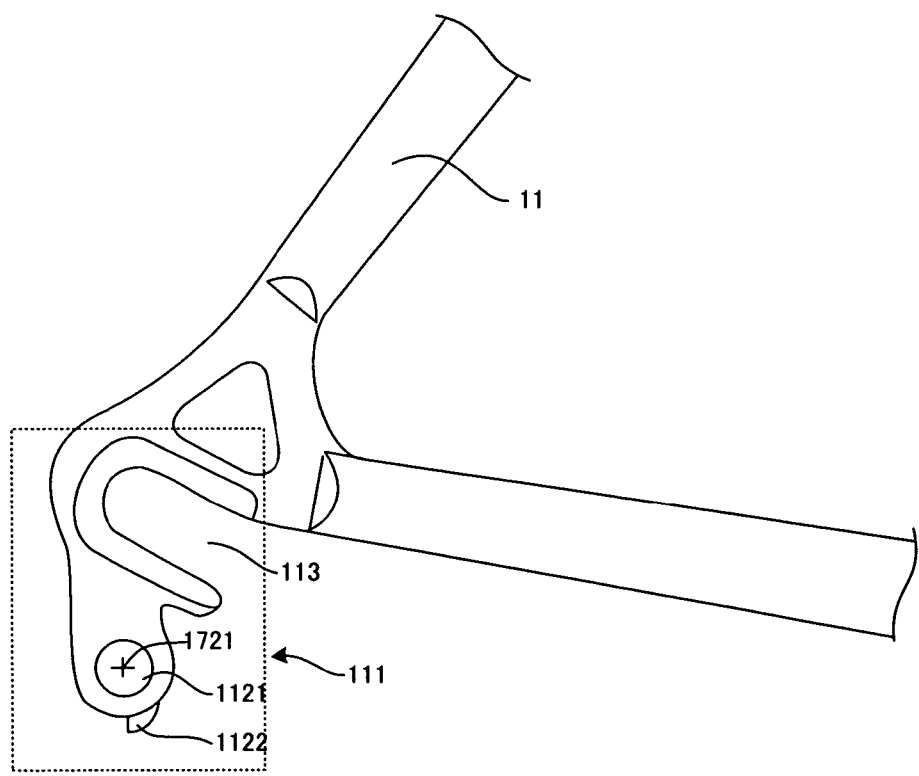
FIG. 5 is a partial diagrammatic view showing an installation area 111 of the frame 11 for mounting the derailleur 172.

The description will be made of an example of the rear derailleur 172 suitable to be used for the frame 11 equipped with an installation area 111 for mounting the derailleur 172 thereto. FIG. 2 is an enlarged external appearance view when the rear derailleur 172 and the frame 11 are viewed from the right side of the bicycle 1, and FIG. 3 is a schematic diagram when viewed from behind the bicycle 1. Also, FIG. 4 is an explanatory view showing the rear derailleur 172 removed from the frame 11, and FIG. 5 is a partial diagrammatic view showing the installation area 111 of the frame 11 having the above-described structure. In this respect, in FIG. 3, positional relationship on the movable (parallel rocking) member 22 between a guide arm rocking axis 232 and a tension arm rocking axis 243 is not represented accurately because this figure is merely provided for explaining the lateral shift positions (speed variation) due to a parallel link mechanism.

As shown in FIG. 5, the derailleur installation area 111 is a structural portion, which protrudes below an axle installation area 113 of the frame 11, and has a derailleur installation hole 1121 with a female thread cut therein and a stopper 1122. When the rear derailleur 172 has been installed to the frame 11 by a base member 21, a center line of the derailleur installation hole 1121 coincides with a main (base) derailleur rocking axis 1721 as described later. The main derailleur rocking axis 1721 is parallel to the rear wheel axis 131.

Figure 6:
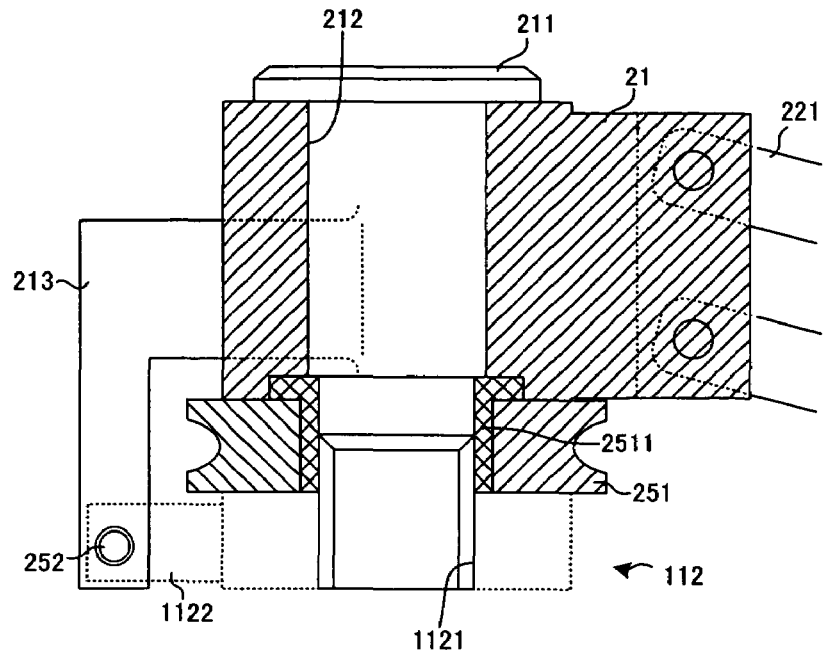
FIG. 6 is a longitudinal cross-sectional view showing a base member 21 of the derailleur 172.

FIG. 6 shows a longitudinal cross-sectional view of the base member 21. The base member 21 is provided with a protrusion portion 213 having a female thread in which a stopper (screw) 252 is screwed, and a through hole 212 for passing a derailleur installation bolt 211 therethrough. Also, on the side surface of the base member 21, there are installed a pair of parallel links 221 in such a manner as to be freely pivotal or rockable.

The base member 21 is installed by screwing the derailleur installation bolt 211 into the derailleur installation hole 1121 through the through hole 212. Also, a cable pulley 251 is installed around the derailleur installation bolt 211 using a pulley bearing 2511 in such a manner as to be freely rotatable (pivotable). In the case of FIG. 6, a sleeve type bearing (plain bearing) is shown as the pulley bearing 2511. However, it is also possible to use a rolling type bearing such as a type with a plurality of ball bearings.

With the above structure, the base member 21 and the cable pulley 251 are independently rotatable relative to the frame 11. When the base member 21 pivots, the stopper (screw) 252 provided on the base member 21 and the stopper 1122 provided on the frame normally abut against each other at a predetermined angular position, whereby the base member 21 stops at a fixed angular position. Since the amount of protrusion of the stopper (screw) 252 can be adjusted by turning (rotating) it, the angular stop position of the base member 21 relative to the stopper 1122 can be adjusted. In this respect, with the exception of during disassembly and assembly, these two stoppers are normally maintained in the abutted state, that is, when the bicycle is usually used, these stoppers remain contacted including during speed variation (when various front and/or rear sprockets are utilized to provide various gear ratios for various bicycle speeds) due to chain tension.

Figure 7:
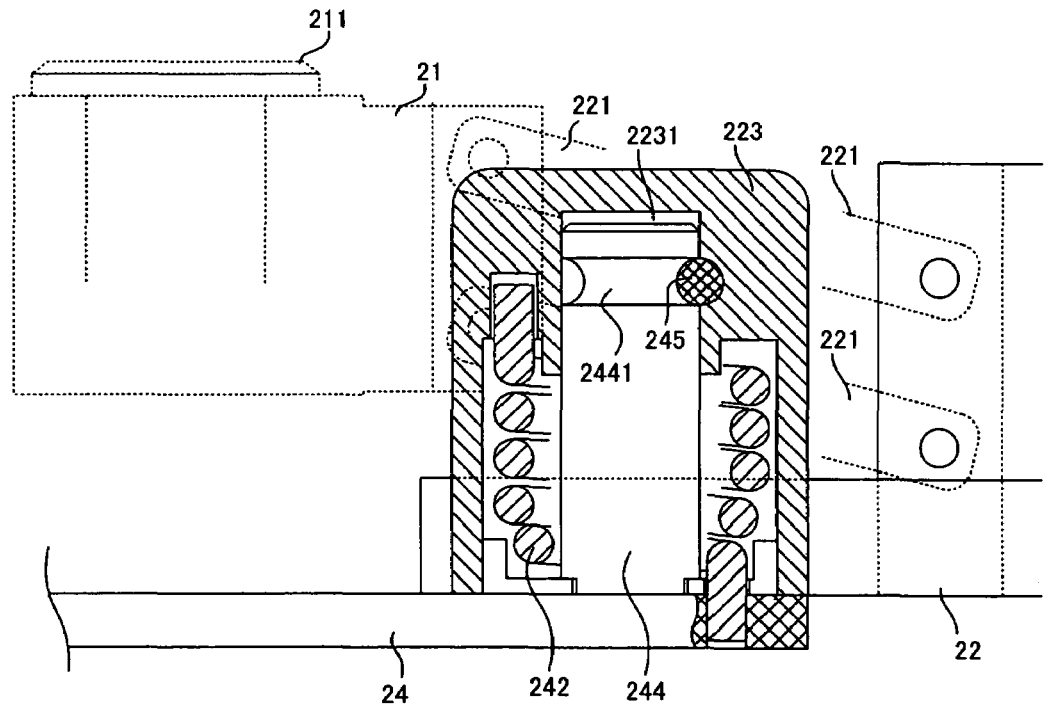
FIG. 7 is a view showing partial sectional structure of installation areas of a movable member or parallel rocking member 22 and a tension arm 24 attached thereto.

FIG. 7 shows partial cross-sectional structure showing an installation area of a movable (parallel rocking) member 22 and a tension arm 24 installed thereto. Each end of one of parallel links 221 is axially supported by the movable (parallel rocking) member 22. For this reason, the base member 21, the movable (parallel rocking) member 22 and a pair of parallel links 221 which connect these together constitute the parallel link mechanism (i.e., a four bar linkage assembly). As shown in FIG. 3, therefore, the movable (parallel rocking) member 22 and the base member 21 are capable of changing their relative positions without changing an angle (i.e., the angular orientation of the movable member 22) relative to the base member 21. Thus, the rear chain wheel 17 with which the chain 18 looped over the guide sprocket wheel 231 engages can be changed. In this respect, in order to fix an end portion of a control cable 25 for the speed variation operation (gear change operations), there is provided a cable end fixing member (means) or cable fixing structure 2211 on one of the parallel links 221, and by operating (pulling or releasing) the control cable 25, the position of the above-described movable (parallel rocking) member 22 is changed (See FIGS.2, 4 and the like).

To the movable (parallel rocking) member 22, there is fixed a cylindrical spring housing or biasing spring pot 223. The housing (biasing spring pot) 223 has a space 2231 therein, in which a biasing member (i.e., a coil-shaped biasing spring) 242 is contained. One end of the biasing spring 242 is restrained within the pot while the other end is restrained by the tension arm 24. To the tension arm 24, there is fixed a tension arm shaft 244 having an annular groove 2441. This tension arm shaft 244 penetrates (extends through) the biasing spring 242 into the above-described housing (biasing spring pot) 223, and is permitted to rotate but is prevented from coming off by means of a dislocation preventing pin 245 and the annular groove 2441. Since a torsional force is imparted to the biasing spring 242 for assembly, the tension arm 24 is rotatable around a tension arm rocking axis 243 (second rocking axis) relative to the movable member 22, and the biasing spring 242 is to impart a biasing force (biasing force which is going to bend toward the rear of the bicycle in the installed state) in a fixed direction. In other words, the tension arm is normally biased in a clockwise rotational direction by the biasing member 242 from a first position (e.g. such as that shown in FIGS. 2, 8, 9 or 10) toward the position shown in FIG. 4.

Also, as shown in FIG. 4 and the like, a guide arm 23 is provided, which is freely pivotal around the guide arm rocking axis 232 (first rocking axis) on the movable member 22 so as to be freely rockable. In other words, as best understood from FIGS. 8–10, the guide arm 23 is not rotationally biased in either rotational direction by a biasing member, unlike the tension arm 24. On the guide arm 23 and the tension arm 24, a guide pulley or sprocket wheel 231 and a tension pulley or sprocket wheel 241 are supported so as to be freely rotatable about first and second rotation axes, respectively. The distance on the tension arm 24 between the tension arm rocking axis 243 (second rocking axis) and the second rotational axis of the tension sprocket wheel 241 is preferably made longer than the distance on the guide arm 23 between the guide arm rocking axis 232 (first rocking axis) and the first rotation axis of the guide sprocket wheel 231. Also, the guide arm rocking axis 232 is preferably located at a side forward of the tension arm rocking axis 243 on the bicycle during normal use and when installed in a normal operating position. Thus, as described above, it is a feature of the present invention that the guide arm 23 and the tension arm 24 are rockable independently of each other on the movable member 22. Also, as described above, it is a feature of the present invention that the tension arm 24 is rotationally biased by the biasing member 242, while the guide arm 23 is not rotationally biased (i.e., the guide arm 23 is freely pivotal without being biased in either rotational direction).

Rear Derailleur and Speed Variation State

Figure 8:
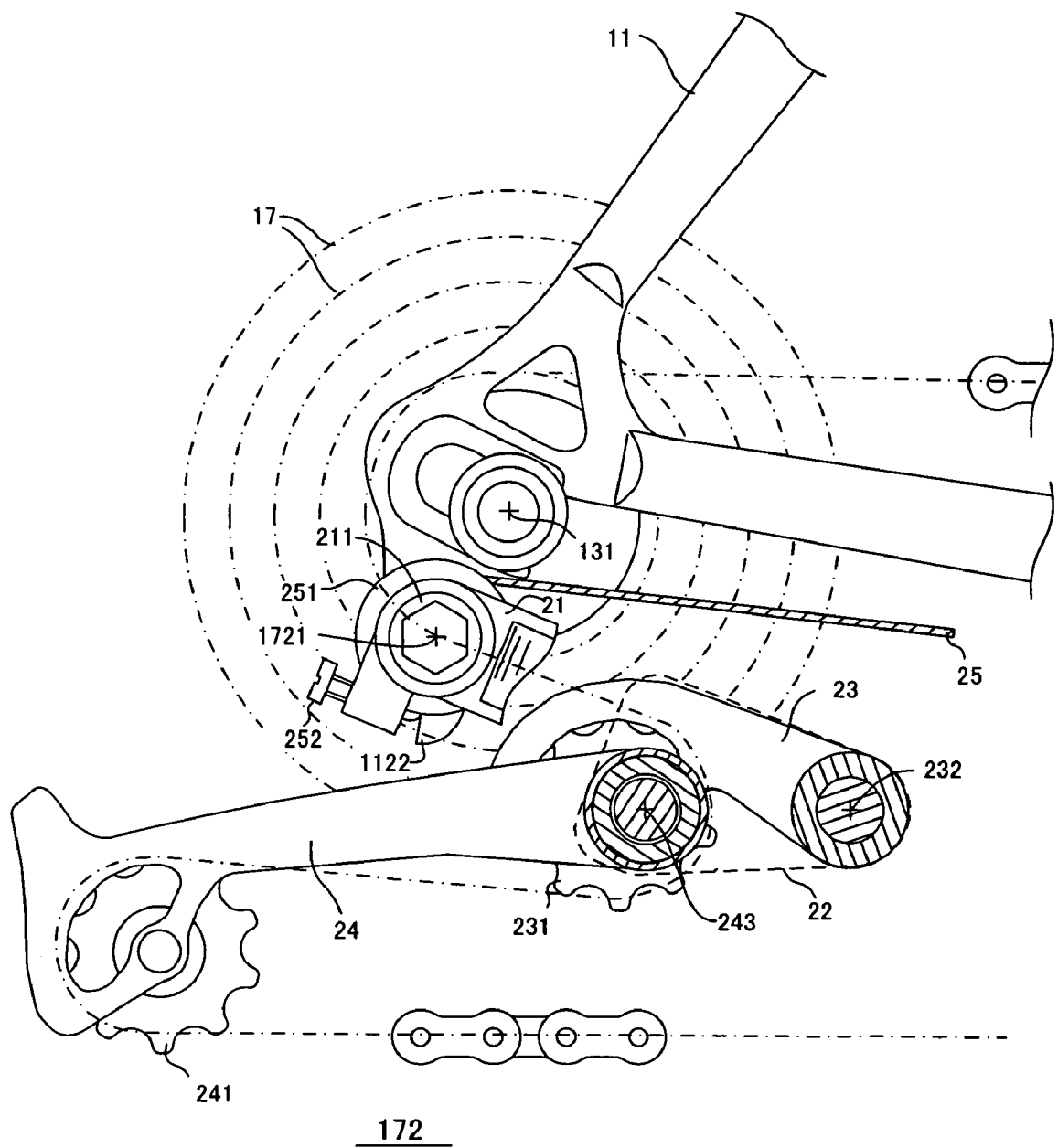
FIG. 8 is an explanatory view showing a state of the rear derailleur 172, which varies in response to the selected gear ratio or speed variable state.
Figure 9:
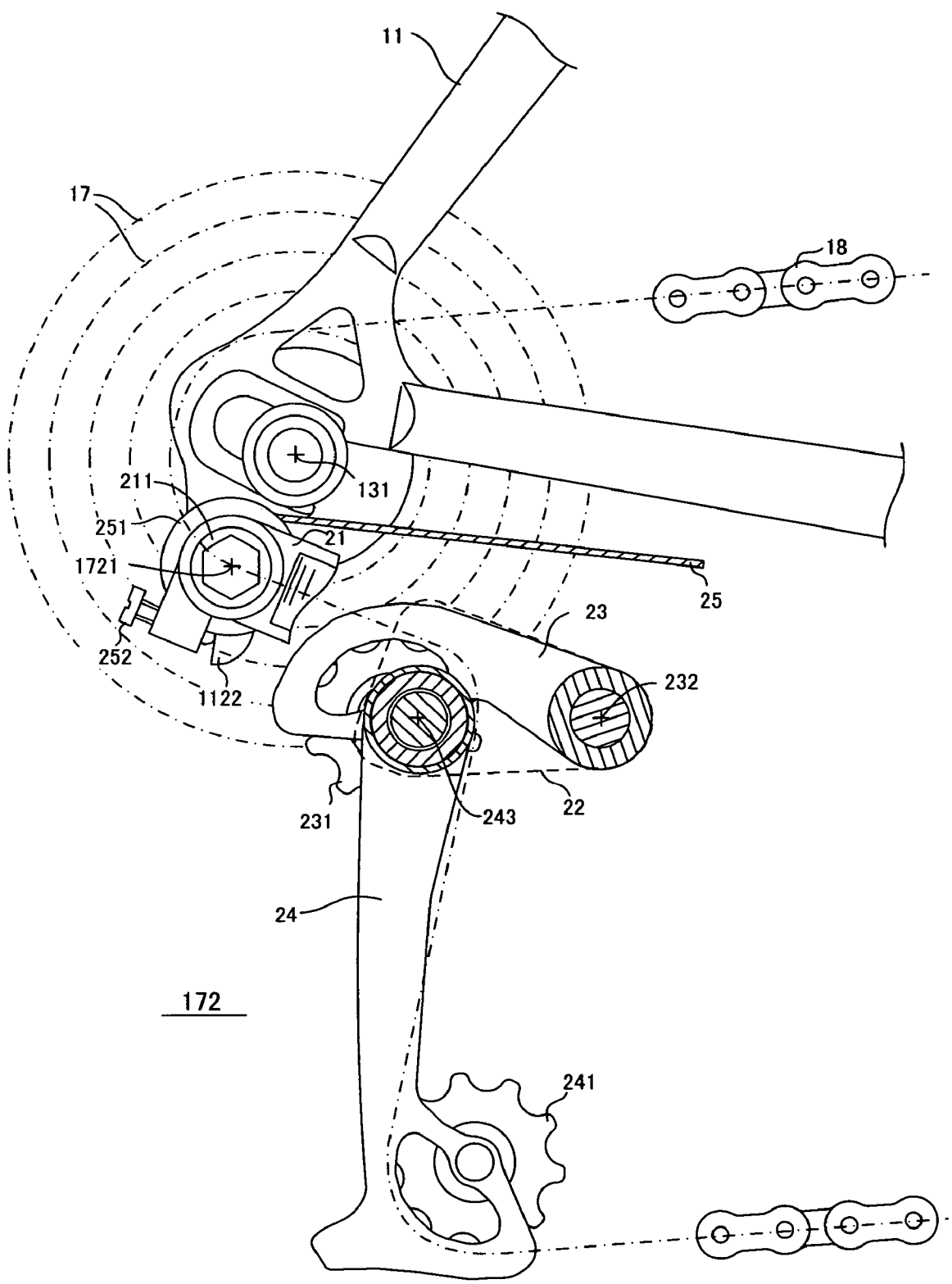
FIG. 9 is an explanatory view showing another state of the rear derailleur 172, which varies in response to the selected gear ratio or speed variable state.
Figure 10:
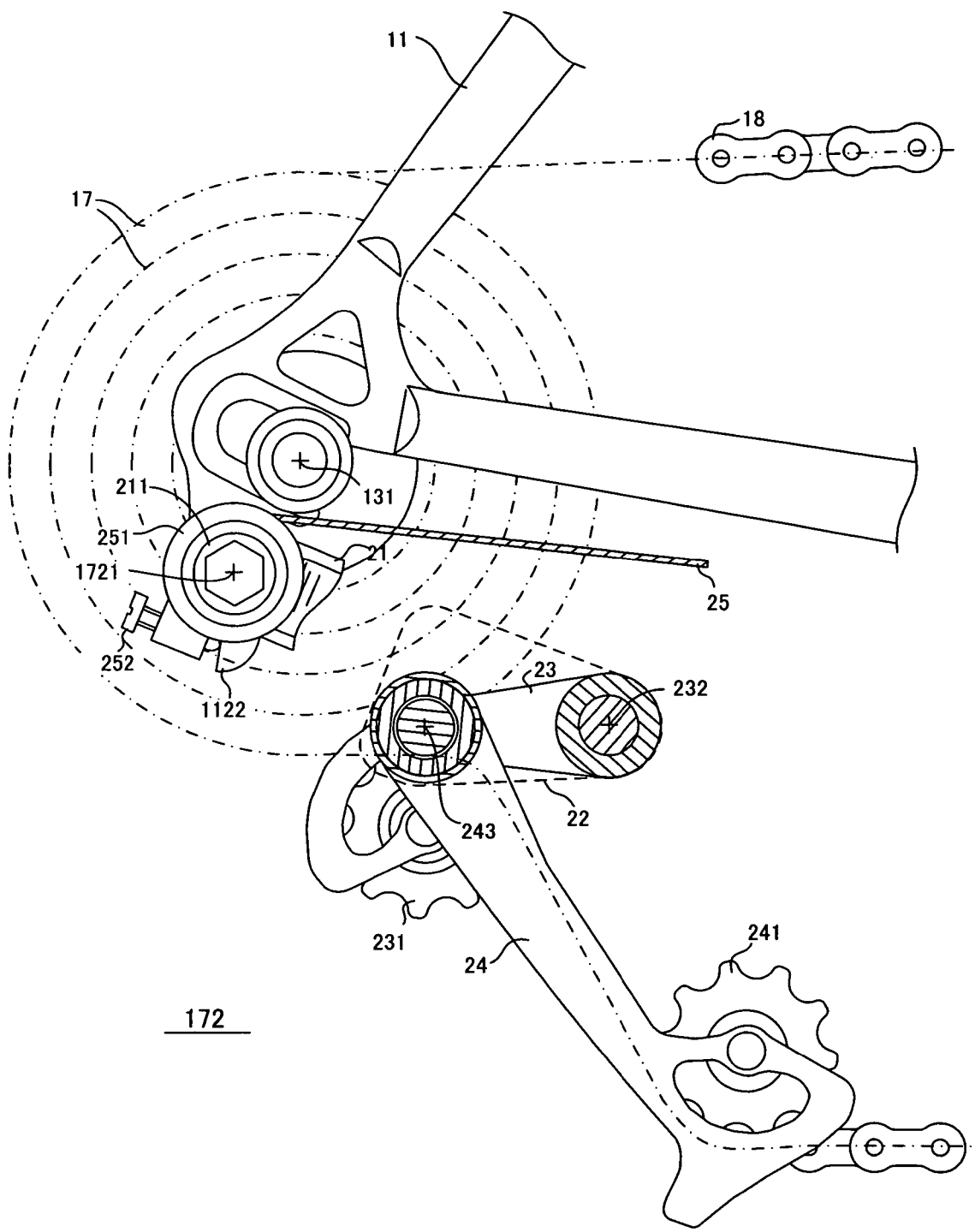
FIG. 10 is an explanatory view showing another state of the rear derailleur 172, which varies in response to the selected gear ratio or speed variable state.

FIGS. 8, 9 and 10 are explanatory views for showing states of the rear derailleur 172 which varies in response to the speed variation state (i.e., in response to various front and/or rear sprockets being utilized to provide various gear ratios for various bicycle speeds).

FIG. 8 shows a case in which sprocket wheels of minor diameter have been selected for both the front chain wheel 16 and the rear chain wheel 17, and both the guide arm 23 and the tension arm 24 revolve (pivot) a large amount toward the rear of the bicycle. Great sag of the chain 18 caused by using the sprocket wheels of minor diameter is almost all absorbed, particularly by revolution (pivoting) of the longer tension arm 24.

FIG. 9 shows a case in which the front chain wheel 16 of major diameter and the rear chain wheel 17 of minor diameter have been selected, and some length of the chain 18 has been taken up (consumed) by being wrapped around the larger front chain wheel 16. The amount of chain wrapped around the larger front chain wheel 16 is absorbed or compensated by downward revolution of the tension arm 24. Even in this case, the position of the tension arm rocking axis 243 has hardly been changed. In the case of a conventional rear derailleur, since revolution of the movable member (the equivalent member of the movable member 22 of the present invention) is combined with revolution of the chain guide (having both the tension sprocket and guide sprocket mounted thereto) and h (height between the ground and the tension sprocket wheel) shown in FIG. 1 becomes extremely small (i.e., with a conventional rear derailleur). Thus, as described above, with a conventional rear derailleur, debris, stones or plants may contact the tension sprocket and/or chain. In the present invention (and embodiments), however, since the movable member 22 does not revolve (pivot or rock) because of speed variation (i.e., due to a selected gear ratio), the above-described h can be relatively large, and such a problem becomes more unlikely to take place.

FIG. 10 shows a state of the rear derailleur 172 when both the front chain wheel 16 and the rear chain wheel 17 of major (larger) diameter have been selected. In this state, the guide arm 23 revolves downwardly to match (align) with the rear chain wheel 17 of major diameter, and the tension arm 24 revolves further than in the case of FIG. 9. Even in this case, the position of the tension arm rocking axis 243 has hardly been changed. Also, during this speed variation (gear change), the distance between the guide sprocket wheel 231 and the tension sprocket wheel 241 has been changed, whereby when the front chain wheel 16 and/or the rear chain wheel 17 over which the chain 18 is looped have been changed, sag of the chain which changes depending upon these diameters is absorbed or compensated.

As described above, in this rear derailleur 172, it can be seen that since the tension sprocket wheel 241 is not so close to the ground over the entire range of speed variation, certain problems can be reduced and/or eliminated. Further, even if the front chain wheel 16 over which the chain is looped may be changed over a range from minor diameter to major diameter, a guide sprocket 231 automatically settles in the most stable position corresponding to this diameter and no unreasonable force is exerted, and therefore, it is possible to maintain stable speed variation operations (gear change operations).

Assembly, Disassembly, Adjustment and Cable Pulley

Figure 11:
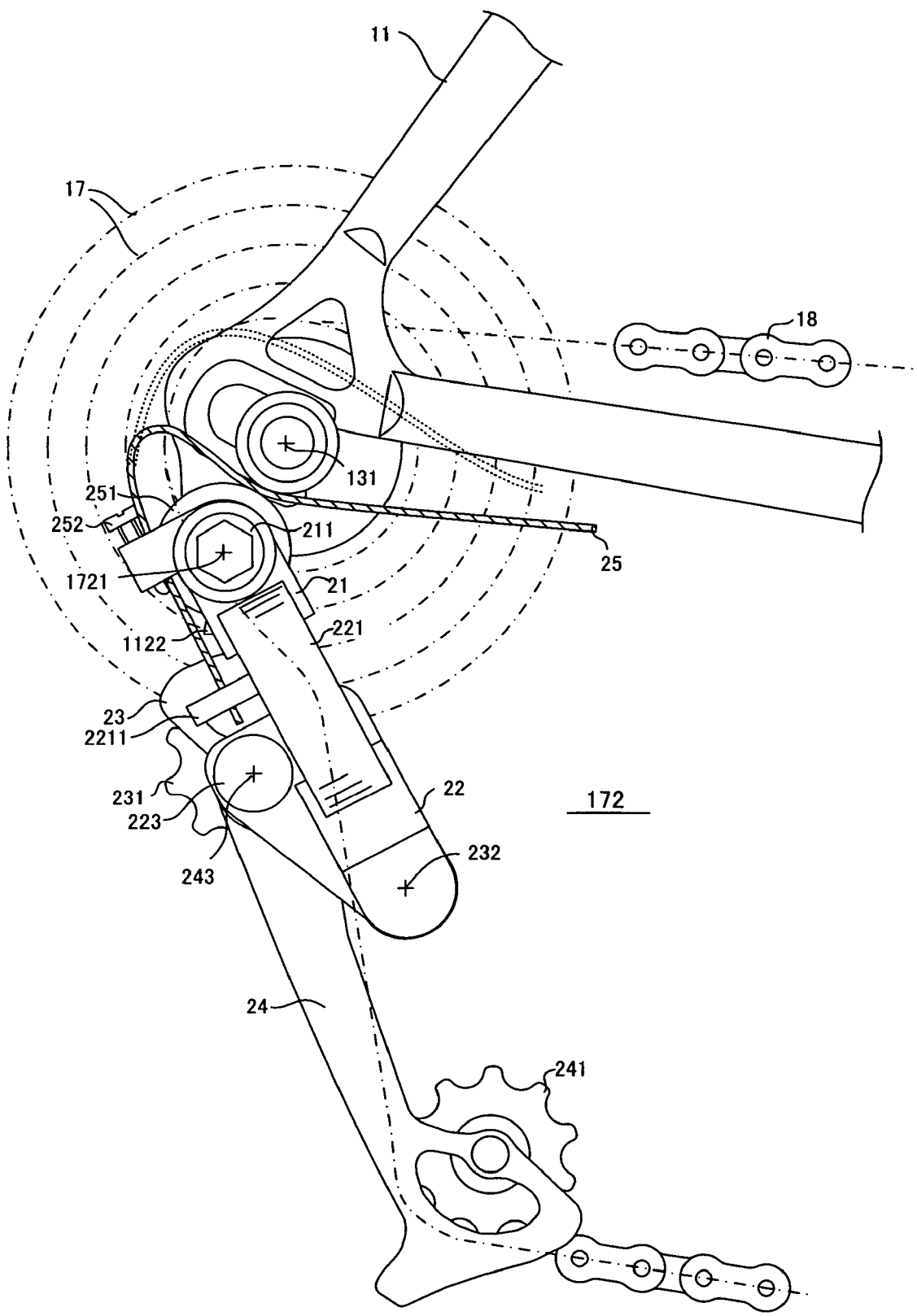
FIG. 11 is an external appearance view showing yet another state of the rear derailleur 172 in which the entire rear derailleur has been pivoted.

FIG. 11 is an explanatory view showing a state when the entire rear derailleur 172 has forcibly been caused to pivot against the chain tension applied by the biasing spring 242, during assembly or disassembly. As described already, the cable pulley 251 has been made freely rotatable relative to the base member 21 and the frame 11. As shown in FIG. 2, the control cable 25 coming from the front portion of the frame 11 is looped over the cable pulley 251, and thereafter, an end portion thereof is fixed to the cable end fixing member 2211 provided at the parallel link 221.

The control cable 25 is drawn, whereby the parallel link 221 is caused to rock within a range from the solid line to the dotted line of FIG. 3 and the guide sprocket wheel 231 is located forward of any one of the rear chain wheels 17. Since the cable pulley 251 is supported through the pulley bearing 2511, friction when the control cable 25 is operated is reduced. By locating the guide sprocket wheel ~231 in different lateral positions, the rear chain wheel 17 with which the chain 18 engages can be changed.

The base member 21 has been made pivotable relative to the frame 11, and when the chain 18 is looped (in normal times), by means of the chain tension applied by a biasing force of the biasing spring 242, the two stoppers (1122 and 252) are biased in a direction that causes them to abut against each other and are in a state shown in FIG. 2 during normal use and the like. Since this state has been brought about by the chain tension applied by the biasing force of the biasing spring 242, against this, the entire rear derailleur 172 can be rotated for mounting and dismounting the rear wheel. FIG. 11 shows a state in which the entire rear derailleur 172 has been thus caused to pivot.

The entire rear derailleur 172 is caused to pivot (in clockwise direction), whereby sag can be imparted to the control cable 25 as shown in FIG. 11. Since usually, the control cable 25 has been stretched or pulled in such a manner as to cross a direction that opens the axle installation area 113, when the axle is going to be removed, it cannot be easily removed because the control cable 25 interferes unless moved out of the way as shown in FIG. 11. The present rear derailleur 172 is capable of causing the entire rear derailleur 172 to pivot as described above and illustrated in FIG. 11, imparting sag to the control cable 25 and retracting to a position that presents no obstacle to wheel removal as indicated by the dotted line by taking advantage of the sag. Thereby, it becomes very easy to remove the wheel.

In this first embodiment, relative positions of the main (base) derailleur rocking axis 1721, the tension arm rocking axis 243 and the guide arm rocking axis 232 have been arranged in a triangular shape, and as regards these arrangement positions, it is possible to freely design such as, for example, arranging on a straight line. Also, conventionally, since two biasing springs have been used (i.e., one at the movable member and one at the base member) in order to absorb the sag of the chain 18, it has been very troublesome to set (design) the interrelationships among these spring forces. In this rear derailleur 172, however, since only a single biasing spring 242 has been used (i.e., at the movable member 22), it is not necessary to take relative spring forces into account, but it is relatively easy to design, and it is also easy to manufacture and assemble the rear derailleur 172 itself.

Second Embodiment

Figure 12:
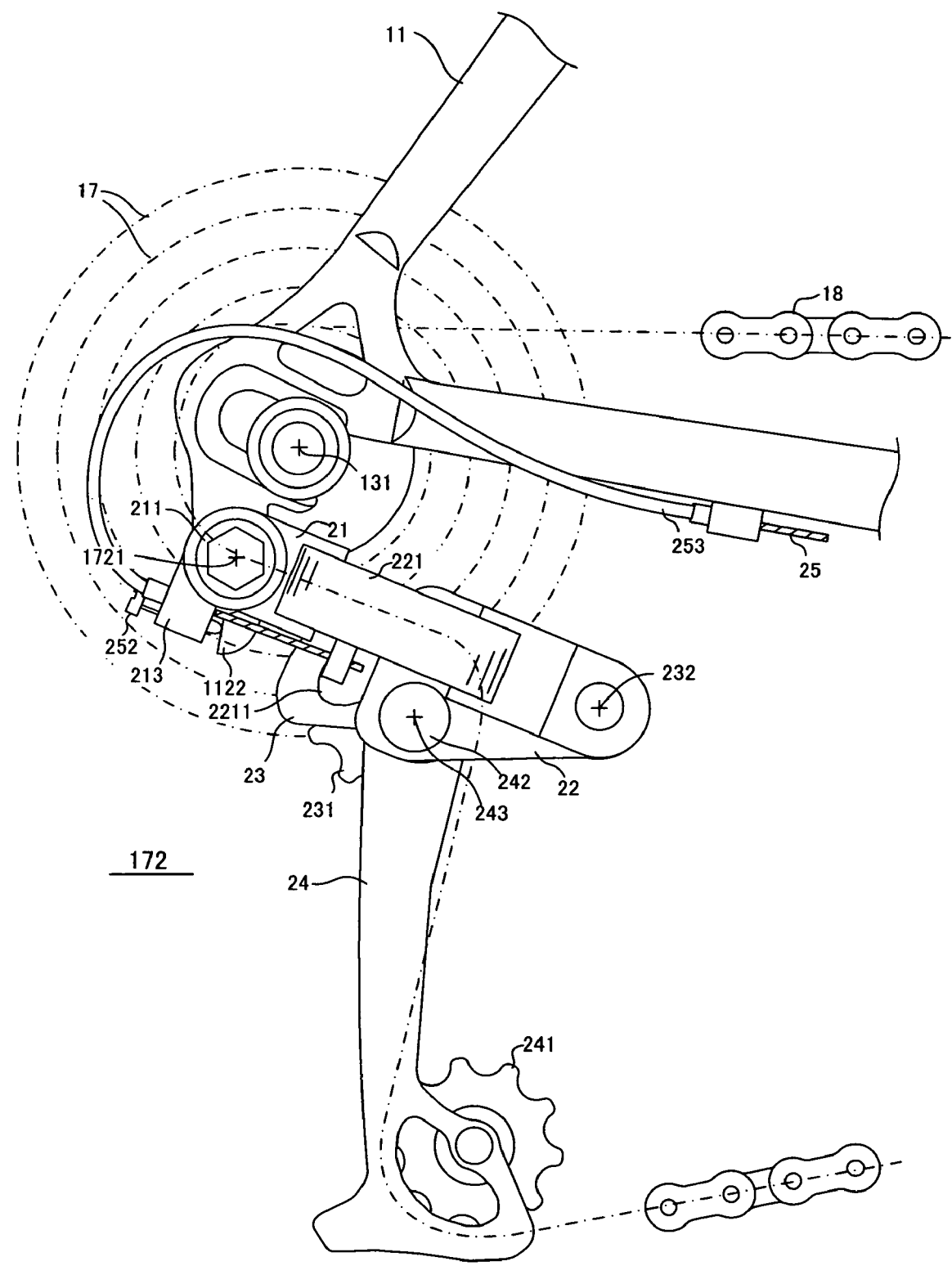
FIG. 12 is a view showing an example (second embodiment) of the rear derailleur 172 in which a control cable with guide tube has been used.

This second embodiment is substantially identical to the first embodiment. Thus, like reference numerals will be used for like parts herein. The control cable is frequently used in combination with a guide tube in which the control cable has been inserted. When such a control cable is used, the cable pulley 251 becomes unnecessary. A rear derailleur 172 of the second embodiment shown in FIG. 12 is an example in which a control cable with guide tube has been used. End portions of the guide tube 253 is inserted and fixed in seats provided at each of the frame 11 and a protruded portion 213 of the base member 21, and the control cable 25 is inserted into/through the guide tube 253. Since this embodiment is the same as in the first embodiments with the exception of the foregoing, explanation concerning the structure, operation and effect of the modifications of this embodiment which overlap with the first embodiments will be omitted.

Third Embodiment

Figure 13:
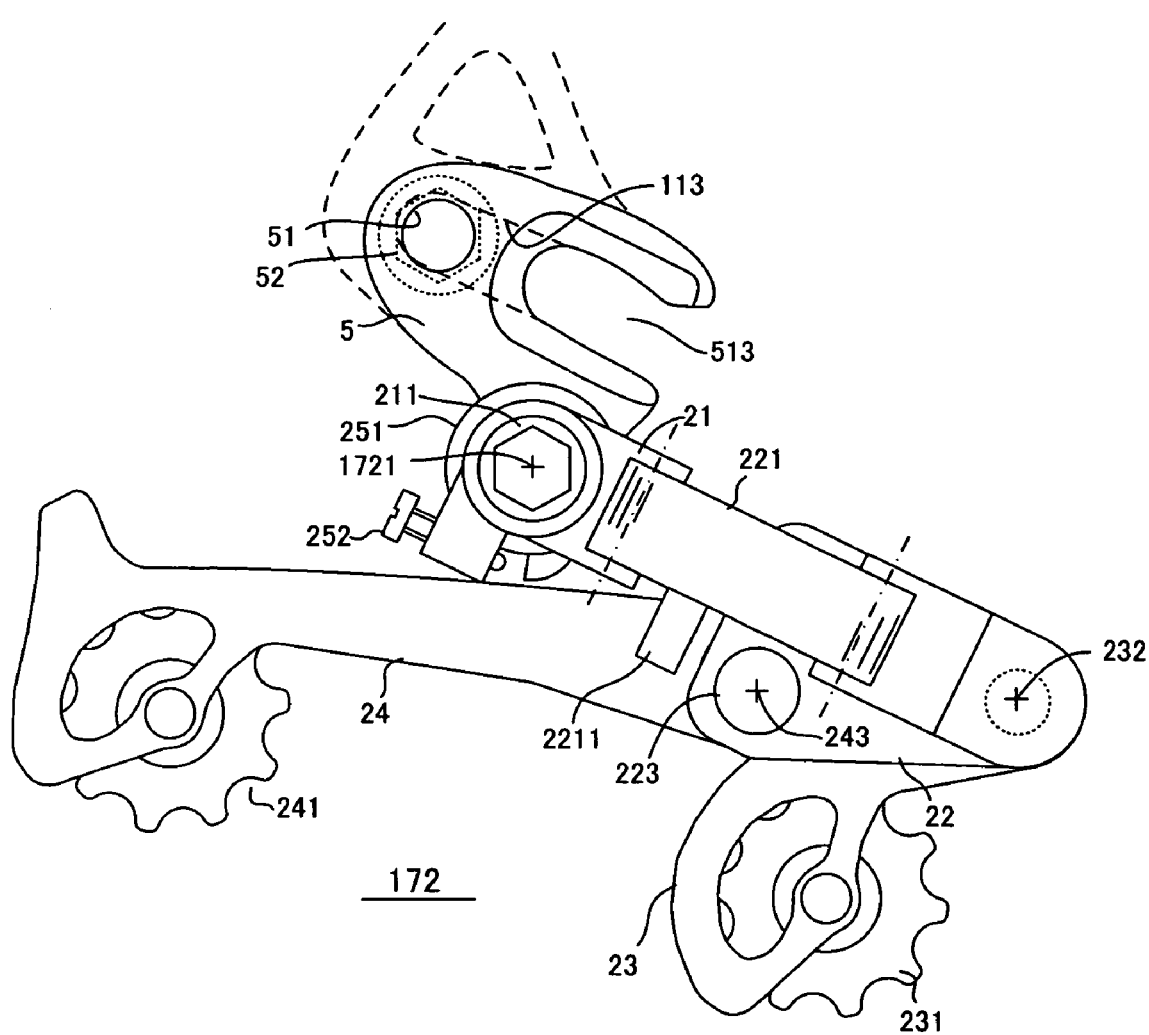
FIG. 13 is an external appearance view showing the rear derailleur according to a third embodiment as a single unit.

This third embodiment is substantially identical to the first and second embodiments. Thus, like reference numerals will be used for like parts herein. FIG. 13 shows a rear derailleur of the third embodiment. The first and second embodiments are predicated on the frame 11 having a derailleur installation area 111 for the exclusive use. However, since the frame 11 without such a derailleur installation area 111 for the exclusive use is also frequently used in the bicycle field, the rear derailleur 172 of this example has a bracket member 5 for installation.

The bracket member 5 has actually the same structure as within the framework indicated by dotted line of FIG. 5, and by combining this bracket member 5 with the rear derailleur 172 according to the first and/or second embodiments, a new rear derailleur 172 has been obtained. This rear derailleur 172 has a bolt through hole 51 and an axle installation slot (hole) 513, and is installed to the frame 11 by means of the bolt 52 (dotted line) and the nut attached so as to superimpose the axle installation slot (hole) 513 on the axle installation slot (hole) 113. The axle installation slot (hole) 513 is cut in the same manner as the axle installation slot (hole) 113 on the frame 11 side, and is shallower than this in depth so that an outside contour between the bolt through hole 51 and the axle installation slot (hole) 513 substantially coincides with the axle installation slot (hole) 113. With the exception of a point that the relationship of the frame 11 to the rear derailleur 172 in the first and second embodiments is replaced with relationship illustrated in FIG. 13 and described herein using the bracket member 5, this embodiment is the same as in the first and/or second embodiments, and therefore, explanation concerning the structure, operation and effect of the modifications of this embodiment which overlap with the first and second embodiments will be omitted.

Fourth Embodiment

Figure 14:
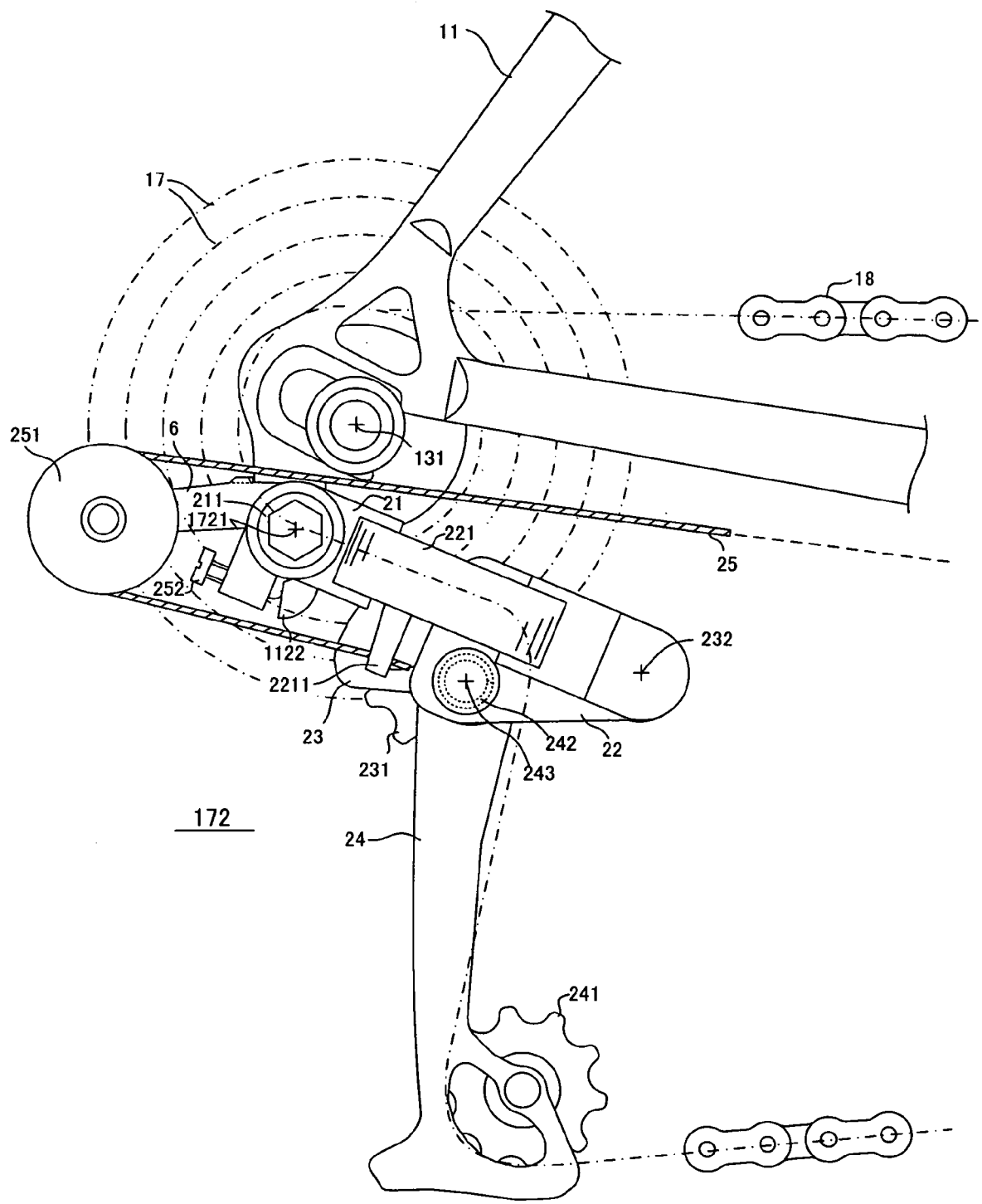
FIG. 14 is an external appearance view when the rear derailleur 172 according to the fourth embodiment and the frame 11 are viewed from the side.
Figure 15:
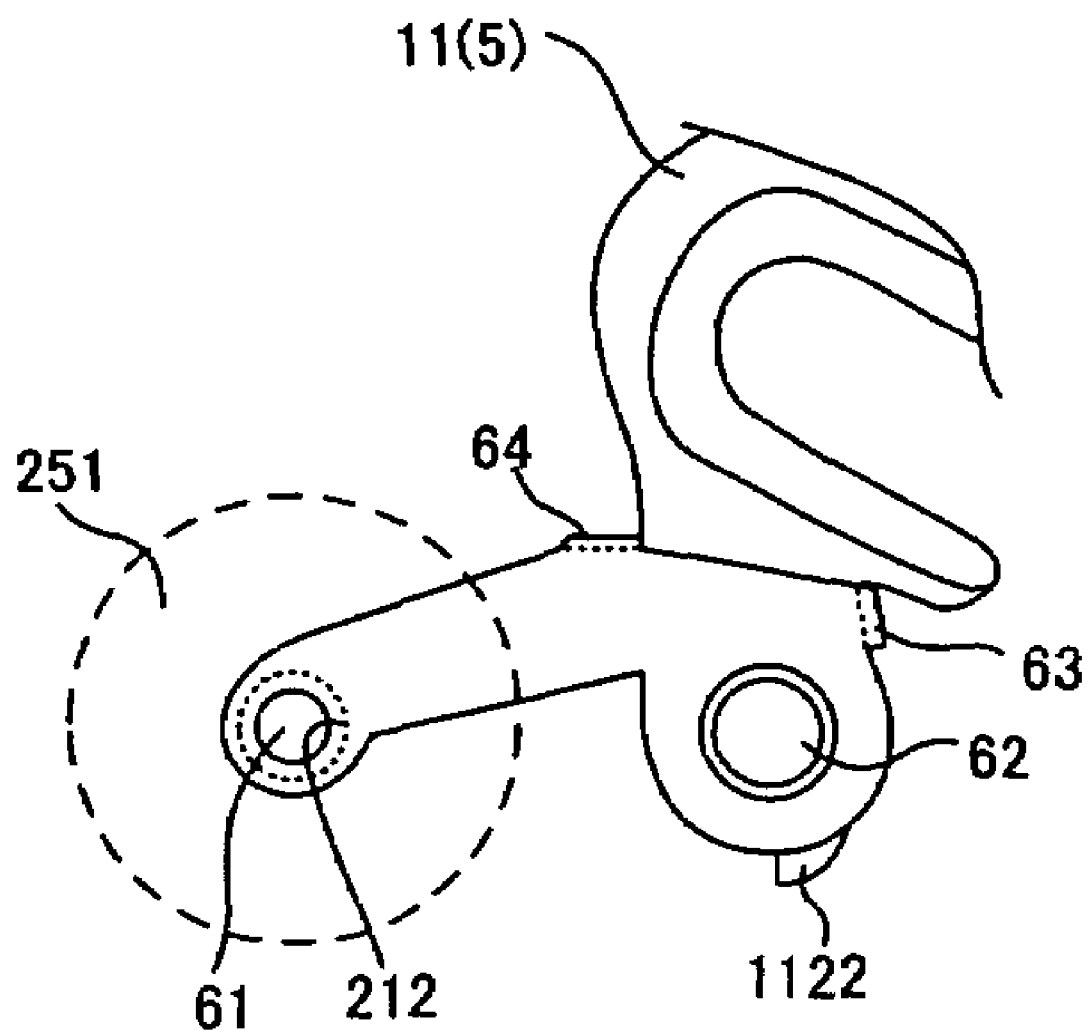
FIG. 15 is an explanatory view illustrating a pulley bracket 6 according to the fourth embodiment.

This fourth embodiment is substantially identical to the first and third embodiments. Thus, like reference numerals will be used for like parts herein. In the rear derailleur 172 according to the first and third embodiments, the cable pulley 251 is provided such that the center thereof is concentric with a rocking axis 1721 of the derailleur. In the case of such structure, the cable pulley 251 is limited in the size of the diameter in order to prevent interfering with the axle. To avoid such a limit, in the rear derailleur 172 of the fourth embodiment, as shown in FIGS. 14 and 15, the center of the cable pulley 251 is located at a position offset with respect to the rocking axis 1721 of the derailleur.

A pulley bracket 6 is provided that is a long plate-shaped member having a shaft hole 61, an installation hole 62, and bent portions 63, 64. The shaft hole 61 is used to fix a pulley shaft which supports the cable pulley 251 rotatably, and the installation hole 62 is used to insert a derailleur installation bolt 211 therethrough. The bent portions 63 and 64 are used to prevent the pulley bracket 6 from rotating by restraining them by the frame 11 (installation area 111) or the bracket member 5.

A distance by which a center (coincides with the center of the through-hole 212 of the cable pulley 251) of the shaft hole 61 is offset with respect to the center of the installation hole 62, that is, a length of the pulley bracket 6 is selected such that the cable pulley 251 having a large diameter can be used without being limited in size as described above. Therefore, a movement of a control cable 25 can be made smoother through the use of the cable pulley 251 having a large diameter.

Also, since the cable pulley 251 rotates at a small angle, it can be made into a segment type. Thereby, there can be avoided a problem of interference between a stopper 252 and the cable pulley 251 which occurs when the base member 21 is rotated during attachment and detachment.

In the foregoing description concerning the rear derailleur according to the embodiments of the present invention, the description has been made of an example of the parallel link mechanism in which the link rocking axis is orthogonal to the rear wheel axle axis 131 and the main derailleur rocking axis 1721. However, even in a rear derailleur referred to as a slant type derailleur, which has a parallel link mechanism in which the link rocking axis is inclined to the rear wheel axle axis, the principle of the present invention can be applied as it is.

According to a rear derailleur of the present invention, since the tension sprocket wheel does not come so close to the ground when the chain is looped over a large chain wheel, an effect that is undesirable can be reduced, as explained above. Further, since it is possible to pivot the rear derailleur itself for loosening the control cable, an effect that the wheel can be easily detached and attached is exhibited. Also, an effect that an application range for the wheel size can be made wide is exhibited. Further, since there is only one biasing spring used to compensate for chain sag, there are exhibited effects that design concerning relative spring force of two biasing springs which the conventional rear derailleur has becomes easier, and it becomes easier to manufacture and assemble. Further, even if the front chain wheel 16 over which the chain is looped is changed over a range from minor diameter to major diameter, the guide sprocket 231 automatically settles in the most stable position corresponding to this diameter and no unreasonable force is exerted, and therefore, there is exhibited an effect that it is possible to maintain a stable speed variation operation.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A rear bicycle derailleur, comprising:
a base member having an installation area adapted to be mounted to a bicycle frame;
a movable member;
a pair of parallel links interposed between said base member and said movable member to form parts of a parallel link mechanism together with said base member and said movable member such that said movable member is movable relative to said base member between a retracted position and an extended position;
a guide arm pivotally coupled to said movable member so as to be freely rockable around a first rocking axis without being rotationally biased in a predetermined rotational direction;
a guide sprocket provided on said guide arm that is freely rotatable around a first rotation axis parallel with said first rocking axis;
a tension arm pivotally coupled to said movable member so as to be rockable around a second rocking axis;
a tension sprocket provided on said tension arm that is freely rotatable around a second rotation axis parallel with said second rocking axis; and
a biasing spring provided between said tension arm and said movable member in order to bias said tension sprocket in a rearward direction relative to the bicycle frame.

2. A rear derailleur according to claim 1, wherein
said base member is configured and arranged to be pivotally coupled to the bicycle frame about a base derailleur rocking axis and a link rocking axis about which said parallel link mechanism rocks is orthogonal relative to said base derailleur rocking axis.

3. A rear derailleur according to claim 1, wherein
said first rocking axis is located at a side forward of said second rocking axis when said rear derailleur is mounted to the bicycle frame in a normal operating position.

4. A rear derailleur according to claim 1, wherein
a distance between said second rocking axis and said second rotation axis of said tension sprocket is longer than a distance between said first rocking axis and said first rotation axis of said guide sprocket.

5. A rear derailleur according to claim 1, wherein
said installation area of said base member has a through hole formed therein that is configured and arranged to receive a fixing bolt in order to install said rear derailleur to the bicycle frame.

6. A rear derailleur according to claim 5, further comprising
a cable pulley rotatably coupled relative to said base member that is configured and arranged to have a control cable looped at least partially around an outer periphery thereof.

7. A rear derailleur according to claim 6, wherein
said cable pulley includes a bearing configured and arranged to reduce friction during rotation of said cable pulley.

8. A rear derailleur according to claim 6, wherein
said through hole and said cable pulley are concentric with each other.

9. A rear derailleur according to claim 6, wherein
said through hole and said cable pulley have centers that are offset from each other.

10. A rear derailleur according to claim 5, wherein
said base member is configured and arranged to be pivotally installed to said bicycle frame using the fixing bolt extending through said through hole; and
said base member includes an adjustable stopper configured and arranged to prevent pivotal movement of said base member relative to the bicycle frame beyond a predetermined pivot position.

11. A rear derailleur according to claim 1, wherein
said installation area is a bracket member independent of said base member body, and said base member body is pivotally installed to said bracket member.

12. A rear derailleur according to claim 11, wherein
said base member includes an adjustable stopper configured and arranged to prevent pivotal movement of said base member relative to said bracket member beyond a predetermined pivot position.

13. A rear derailleur according to claim 1, wherein
one of said parallel links is provided with a cable fixing structure configured and arranged to fixedly attach a control cable thereto.

14. A rear derailleur according to claim 1, wherein
said first rocking axis is located further from said base member than said second rocking axis.

15. A rear derailleur according to claim 1, wherein
said guide arm and said tension arm are arranged and configured such that said tension arm is pivotal about said second rocking axis without moving said guide arm.

16. A rear derailleur according to claim 15, wherein
said guide arm and said tension arm are further arranged and configured such that said guide arm is pivotal about said first rocking axis without moving said tension arm.

17. A rear derailleur according to claim 1, wherein
said guide arm and said tension arm are arranged and configured such that said guide arm is pivotal about said first rocking axis without moving said tension arm.

18. A rear derailleur according to claim 1, wherein
said base member is configured and arranged to be pivotally coupled to the bicycle frame about a base derailleur rocking axis, and said base member is configured and arranged to normally remain stationary relative to the bicycle frame during normal use.

19. A rear derailleur according to claim 18, wherein
said first rocking axis is located further from said base member than said second rocking axis.

20. A rear derailleur according to claim 18, wherein
said base member is configured and arranged to be pivotally coupled to the bicycle frame about a base derailleur rocking axis, and said base member is configured and arranged to normally remain stationary relative to the bicycle frame during normal use.

21. A rear derailleur according to claim 18, wherein
said tension arm includes a biasing member arranged to rotationally bias said tension arm about said first rocking axis in order to bias said tension sprocket in a rearward direction relative to the bicycle frame.

22. A rear derailleur according to claim 18, wherein
said guide arm is pivotally coupled to said movable member so as to be freely rockable around said first rocking axis without being rotationally biased in a predetermined rotational direction.

23. A rear derailleur according to claim 1, wherein
a distance between said first rocking axis and said second rocking axis is no larger than a distance between said first rocking axis and said first rotation axis.

24. A rear bicycle derailleur, comprising:
a base member adapted to be mounted to a bicycle frame;
a movable member movably coupled to said base member to move relative to said base member between a retracted position and an extended position;
a guide arm pivotally coupled to said movable member so as to be rockable around a first rocking axis, said guide arm having a guide sprocket rotatably mounted thereto about a first rotation axis; and
a tension arm pivotally coupled to said movable member so as to be rockable around a second rocking axis offset from said first rocking axis, said tension arm having a tension sprocket rotatably mounted thereto about a second rotation axis,
said guide arm being configured and arranged to move independently of movement of the tension arm and the tension arm being configured and arranged to move independently of movement of the guide arm, and a distance between said first rocking axis and said second rocking axis being no larger than a distance between said first rocking axis and said first rotation axis.

* * * * *